Patented Nov. 26, 1929

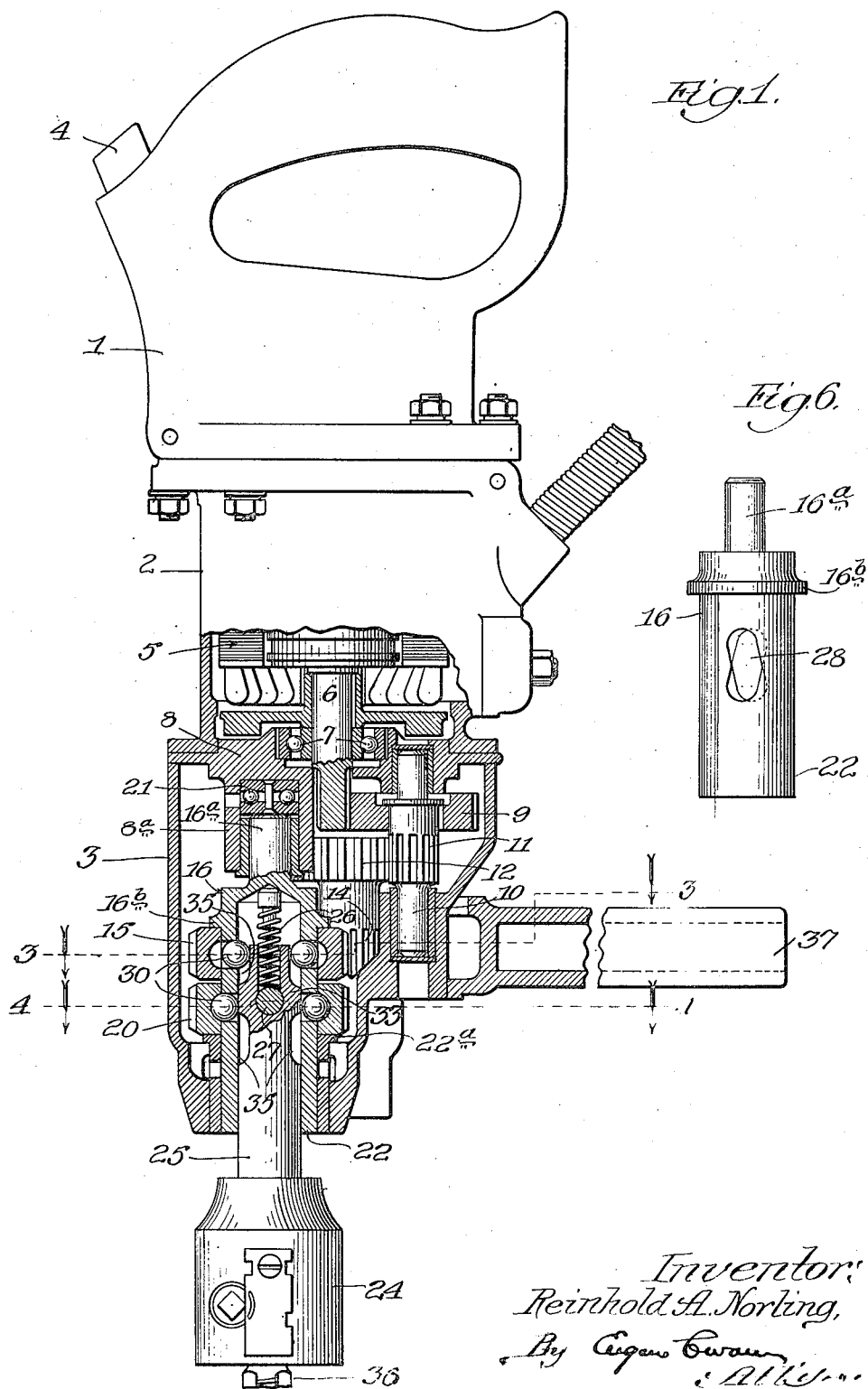

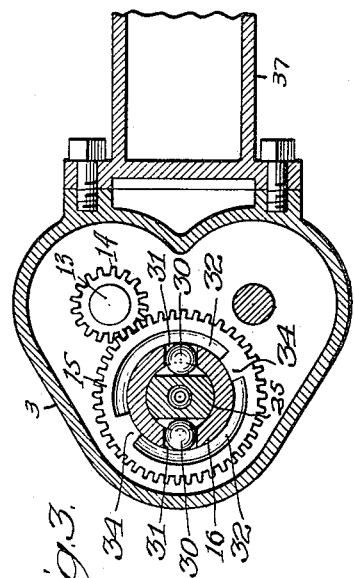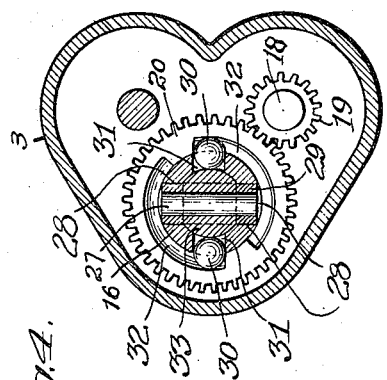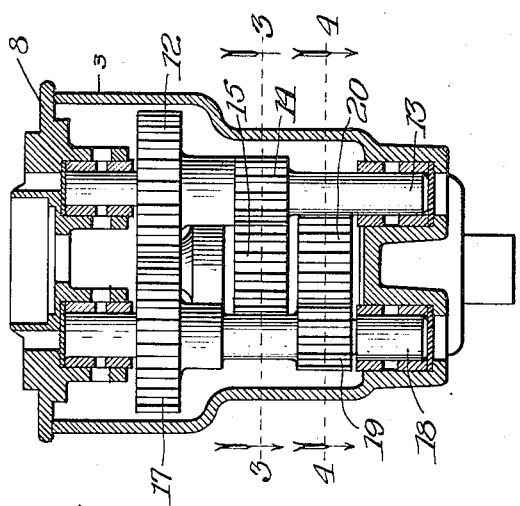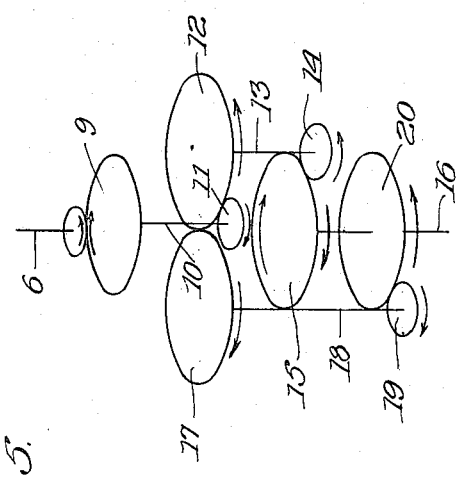

1,737,431

UNITED STATES PATENT OFFICE

REINHOLD A. NORLING, OF AURORA, ILLINOIS, ASSIGNOR TO INDEPENDENT PNEUMATIC TOOL COMPANY, OF CHICAGO, ILLINOIS, A CORPORATION OF DELAWARE

PORTABLE POWER-DRIVEN TAPPING TOOL

Application filed June 14, 1926. Serial No. 115,730.

This invention relates to portable power actuated tapping tools.

One object of my invention is to provide an efficient and practicable tool of this character so that the tap may be run into and out of holes to be threaded by power and at relatively high speed without damaging either the tap or the threads cut thereby.

Another object of my invention is to provide the tool with mechanism whereby the direction of rotation of the tap may be automatically changed as the tool is forced against and drawn from the work, and thus allow the tap to be run into and out of a hole at high speed and at maximum power without reversing the motor or stopping the rotation thereof.

A further object of my invention is to provide clutch means between the tool spindle and the forward and reverse gears so that the clutches may be alternately operated to connect and disconnect the spindle to and from the respective gears in the endwise movement of the chuck and spindle relatively to each other.

The invention consists further in the matters hereinafter described and claimed.

In the accompanying drawings—

Fig. 1 is a side view of my improved tool with parts in vertical section;

Fig. 2 is a view of the gear assembly with the case and associated parts in vertical section;

Figs. 3 and 4 are horizontal sectional views on lines 3—3 and 4—4, respectively, of Figs. 1 and 2;

Fig. 5 is a diagrammatic view showing the arrangement of the driving gears; and

Fig. 6 is a side view of the spindle to be hereinafter described.

In Fig. 1, the complete tool is shown and, as illustrated, it comprises generally three main sections, a handle section 1, a motor section 2, and a reducing gear section 3. These sections are bolted or otherwise secured together in the order named.

The handle section 1 carries the plunger 4 of the switch mechanism whereby the operator may turn on and off the electric current to the tool. The switch mechanism may take the form disclosed in my prior Patent No. 1,529,910, granted March 17, 1925.

The motor section 2 contains an electric motor 5 having its armature shaft 6 extending into the gear section 3 for driving the gears contained therein. The shaft 6 extends through and runs in an antifriction bearing 7 in a bearing support 8 clamped between the motor and gear sections 2, 3, as shown in Fig. 1.

Of the parts in the gear section 3, the one 9 is the first reducing gear and it meshes directly with the shaft 6, the latter having gear teeth at its outer end for the purpose. Gear 9 is fixed to a shaft 10, which has its opposite ends journaled in the support 8 and outer wall of the gear case 3, respectively, as shown in Figs. 1 and 2. Said shaft 10 is provided with gear teeth 11 constituting the first reducing gear pinion. This pinion 11 meshes with the second reducing gear 12 for forward speed. Gear 12 is fixed to a shaft 13, which as shown in Fig. 2 has its opposite ends also journaled in parts 8 and 3, respectively. This gear has an elongated hub provided with gear teeth 14, which constitutes the second reducing gear pinion. This pinion 14 meshes with a gear 15 loosely mounted on the spindle 16 of the tool, said gear 15 constituting the forward spindle gear.

As shown in Fig. 2, gear 12 meshes with a gear 17 which constitutes the first reducing gear of reverse speed. This gear 17 is fixed to a shaft 18 journaled in parts 8 and 3, as shown. Gear 17 has an elongated hub provided with teeth 19 which form the reducing gear pinion of the gear. This pinion 19 meshes with a gear 20 loose on the spindle 16 below the gear 15, as shown in Fig. 1, and constituting the reverse gear for the spindle.

The spindle 16 is hollow and extends into the gear case 3 from its outer or lower end, as shown in Fig. 1. The inner or upper end 16ª of the spindle is reduced and is journaled in a tubular extension 8ª on the member 8. An antifriction end thrust bearing 21 is in this extension for the spindle. A bushing 22 is in the outer end of the gear case 3 for the forward portion of the spindle 16.

The reverse gear 20 runs on the upper end of this bushing, while the forward gear 15 is held from rising by a stop collar 16ᵇ above the same on the spindle 16, as shown in Fig. 1. The bushing 22 has its upper end flanged, as at 22ª, so as to provide a suitable bearing for the gear 20 and also to engage the adjacent portion of the case to hold the bushing in the same.

For the spindle 16 there is a tool holding chuck 24 of any desired design. The chuck is beyond the outer end of the spindle 16 and has a stem 25 extending into the same. Within the spindle 16 between the closed inner end thereof and the adjacent end of the stem 25 is a coiled expansion spring 26. This spring normally tends to force the stem 26 out of the spindle. The outward movement of the stem is limited, however, by a cross-pin 27 carried by the stem and having its ends in vertically elongated slots 28 in the spindle 16, as shown in Figs. 4 and 6. To promote ease of operation, the ends of this pin are provided with rollers 29, 29 to work against the sides of these slots, which are reversely inclined as shown in Fig. 6. Pin 27 also connects the stem to the spindle so that the latter will rotate the former.

The clutch for each gear 15 and 20 includes a pair of oppositely disposed clutch dogs 30, 30, which as shown in the drawings are in the form of balls. These balls are retained in holes 31, 31 in the hollow portion of the spindle 16 at the gears 15 and 20, respectively, as shown in Fig. 1. Said gears have internal grooves 32, 32 to receive the outer portions of the associated balls 30, 30 when forced into them by the cam portion 33 of the stem 25. There are two of these grooves 32 in each gear, one for each ball 30 with the grooves in each gear separated by shoulders or abutments 34, 34 formed integral with the gear, as shown in Fig. 3. When in these grooves and against the shoulders, the balls connect the respective gears 15, 20 to the spindle 16 for driving the clutch thereby either forward or reverse, depending on which gear is clutched to the spindle.

The cam 33 is adjacent the upper or inner end of the stem 25 and has longitudinally disposed slots or recesses 35, 35 on opposite sides thereof, one for each ball 30, 30, to receive the inner portions thereof when the gears 15, 20 are disconnected from the spindle and are free to turn thereon, as shown in Fig. 3. The ends of these slots or recesses 35 are inclined into the cam 33 so that the balls 30 will be moved into the grooves 32 of their associated gears in the shifting of the cam back of said balls, as shown in Fig. 1.

The tool operates as follows. A tap, such as indicated at 36 in Fig. 1, is secured in the chuck 24 and the motor 5 set in operation by turning on the switch through the plunger 4. With the tap out of contact with the work, the parts are in the positions shown in Fig. 1 and the spindle 16 is rotated in reverse or anti-clockwise, due to the fact that the spring 26 holds the cam 33 at the lower set of dogs 30 and connects the reverse gear 20 to the spindle.

Without stopping the motor 5, the tap 36 is inserted in the hole to be tapped and the entire tool forced against the work. This causes the spindle 16 to be moved toward the chuck 24 and shifts the cam 33 from the lower to the upper set of dogs or balls 30. As the cam 33 leaves the lower set of balls 30, the latter are free to move out of the grooves 32 of said gear and disconnect the same from the spindle 16. This happens before the upper gear 15 is clutched to the spindle 16 in order that one gear will be disconnected from the spindle before the other is connected therewith. This is brought about by having the spacing between the two sets of balls 30, 30 substantially equal to or slightly greater than the width of the cam.

As the tool is forced or pressed against the work, the inclined ends of the upper set of slots or recesses 35 force the upper set of balls 30 into the grooves 32 of the upper gear 15 and clutch the same to the spindle 16 for driving the tap 36 forward, that is, clockwise or in a direction to cut threads in the hole. The cam 33 being behind the upper set of balls holds the forward gear 15 clutched to the spindle 16. As soon as the hole is tapped or a sufficient number of threads cut therein, as the case may be, the entire tool is moved backward or drawn away from the work and the cam 33 is automatically shifted to release the forward gear 15 from the spindle and connect the reverse gear 20 thereto to rotate the tap out of the hole without injuring the threads cut therein, all without stopping the rotation of the motor 5 or changing its direction of rotation.

So far as I am aware, I am the first to devise a practicable portable power driven tapping tool so that the tapping of holes may be carried on by power with as much ease and dispatch as the drilling of the holes by an electric drill. This allows for large production because the holes may be tapped rapidly, accurately, and expeditiously without hindrance by the lay of the work.

Moreover, by my invention, the reversal of the direction of rotation of the tap may be quickly and automatically effected by merely moving the tool toward and from the work without stopping or changing the direction of rotation of the motor. This allows for rapid production because the change may be made the instant desired with the motor continuously running in one dirction and at high speed, thereby providing the application of maximum power at all times. The tap is backed or turned out of the hole by power, thereby allowing for rapid work and the cutting of accurate threads.

In Fig. 1, I have shown a grasping handle 37 extending laterally outward from the case 3 near its outer end.

During the operation of the motor 5, the gears are continuously running. Their directions of rotation are indicated in Fig. 5. The armature shaft 6 is rotated anti-clockwise. This turns the first reducing gear clockwise and, through pinion 11, turns the second reducing gear 12 anti-clockwise. Through pinion 14 on this last gear, forward gear 15 is turned clockwise. Gear 17 is turned clockwise, and, through pinion 19, reversing gear 20 is rotated anti-clockwise.

The details of structure shown and described may be variously changed and modified without departing from the spirit and scope of my invention.

I claim as my invention:

1. A portable power driven tapping tool having a hollow spindle, power operated means for rotating the spindle including forward and reverse gears loose on said spindle, a chuck having a stem extending into said spindle and having a pin and slot connection therewith, and coacting means carried by the spindle and stem, respectively, and operable through the endwise movement of the stem in the spindle for alternately clutching the spindle to the respective gears.

2. A portable power driven tapping tool having a hollow spindle, power operated means for rotating the spindle including forward and reverse gears loose on said spindle, a chuck having a stem slidably mounted in and connected with said spindle for rotation thereby, clutch dogs carried by the spindle and movable by the stem into and out of clutched engagement with the respective gears in the endwise movement of the stem and spindle relatively to each other, and spring means for normally urging the stem outward from the spindle.

3. A portable power driven tapping tool having a hollow spindle, power operated means for rotating said spindle including forward and reverse gears loose on said spindle, a chuck having a stem slidably mounted in and connected with said spindle for rotation thereby, clutch dogs carried by the spindle at the gears, cam means on the stem for moving and holding the dogs into clutched engagement with the respective gears in the endwise movement of the stem and spindle relatively to each other, and spring means for normally urging the stem outward from the spindle.

4. A portable power driven tapping tool having a hollow spindle, power operated means for rotating said spindle, including forward and reverse gears loose thereon, a chuck having a stem slidably mounted in and connected with said spindle for rotation thereby, a set of clutch dogs carried by the spindle at each gear, cam means on the stem between the two sets of dogs for moving the same into clutch engagement with the respective gears in the endwise movement of the stem and spindle relatively to each other, said stem having dog receiving recesses on opposite sides of its cam means, and spring means for normally urging the stem outward from the spindle.

5. A portable power driven tool having connected motor and gear case sections, a motor in the motor section and having a shaft extending into the gear case section, a spindle in the latter section, speed reducing gearing in the gear case section and connecting the motor shaft to the spindle, said gearing including two gear trains for driving the spindle in opposite directions, a chuck having a stem slidably supported by the spindle and rotated thereby, and clutch means actuated by the stem in the endwise movement thereof with respect to the spindle for automatically connecting the spindle to the respective gear trains in the movement of the chuck toward and from the spindle.

6. A portable power driven tool having a gear case, a hollow spindle therein, a bushing between the spindle and the case, forward and reverse gears loose on said spindle between said bushing and a stop shoulder on the spindle, a chuck at the outer end of said spindle and having a stem extending into the same, and clutch means between the spindle and gears and operable by said stem.

7. A portable power driven tapping tool having a hollow spindle, power operated means for rotating the spindle including forward and reverse gears loose on said spindle, a chuck having a stem slidably mounted in and connected with the spindle for rotation thereby, clutch means carried by the spindle and the respective gears and operable through the spindle from the inside thereof, and means on the stem within the spindle for operating the clutch means of the respective gears in the endwise movement of the stem in the spindle for clutching the spindle to either of said gears, and spring means for normally urging the stem outward from the spindle.

8. A portable power driven tapping tool having a hollow spindle, power operated means for rotating said spindle including forward and reverse gears loose on said spindle, a chuck having a stem extending into the spindle, said spindle having elongated slots therein with reversely inclined sides, a pin carried by the stem and having its ends in said slots, rollers on said slots and carried by said pin, clutch means carried by the spindle and the respective gears and operable from within the same, and means on the stem for operating said clutch means in the endwise movement of the stem with respect to the spindle for clutching the spindle to either of said gears.

In testimony whereof I affix my signature this 8th day of June, 1926.

REINHOLD A. NORLING.